United States Patent
Kim

(10) Patent No.: US 9,729,063 B2
(45) Date of Patent: Aug. 8, 2017

(54) VOLTAGE ADJUSTMENT SYSTEM AND METHOD FOR PARALLEL-STAGE POWER CONVERTER

(71) Applicant: Infineon Technologies Austria AG, Villach (AT)

(72) Inventor: Tae Yong Kim, YongIn (CN)

(73) Assignee: Infineon Technologies Austria AG, Villach (AT)

( * ) Notice: Subject to any disclaimer, the term of this patent is extended or adjusted under 35 U.S.C. 154(b) by 1 day.

(21) Appl. No.: 14/848,103

(22) Filed: Sep. 8, 2015

(65) Prior Publication Data

US 2017/0070150 A1 Mar. 9, 2017

(51) Int. Cl.
*H02M 3/335* (2006.01)
*H02M 1/42* (2007.01)
*H02M 1/00* (2006.01)

(52) U.S. Cl.
CPC ......... *H02M 3/33507* (2013.01); *H02M 1/42* (2013.01); *H02M 2001/0009* (2013.01)

(58) Field of Classification Search
CPC ......... H02M 3/33507; H02M 3/33523; H02M 3/33569; H02M 3/33592; H02M 2007/4815; H02M 2007/4822; H02M 3/285; H02M 3/1584; Y02B 70/1416; Y02B 70/1441; Y02B 70/1443; H02J 2001/106; H02J 1/102
USPC .......................................... 363/21.01–21.18
See application file for complete search history.

(56) References Cited

U.S. PATENT DOCUMENTS

| | | | | |
|---|---|---|---|---|
| 6,731,524 | B2* | 5/2004 | Elek | H02M 1/34 323/207 |
| 2002/0188383 | A1* | 12/2002 | Elek | H02M 1/34 700/297 |
| 2012/0153730 | A1* | 6/2012 | Barnett | H02M 3/285 307/82 |
| 2012/0262953 | A1* | 10/2012 | Jungreis | H02M 3/285 363/17 |

OTHER PUBLICATIONS

De Groot, et al., "Design of a 1-MHz LLC Resonant Converter Based on a DSP-Driven SOI Half-Bridge Power MOS Module," IEEE Transactions on Power Electronics, vol. 22, No. 6, Nov. 2007, pp. 2307-2320.

(Continued)

*Primary Examiner* — Yemane Mehari
(74) *Attorney, Agent, or Firm* — Slater Matsil, LLP

(57) ABSTRACT

A power system includes a first DC-DC converter circuit and a second DC-DC converter circuit, each including a power input terminal and a sensor. The sensor includes a sensor output terminal and at least one of a current sensor and a voltage sensor. The power system also includes a master Power Factor Correction (PFC) circuit that includes a power output terminal coupled to the power input terminal of the first DC-DC converter circuit; and a slave PFC circuit, which includes a power output terminal coupled to the power input terminal of the second DC-DC converter circuit and a voltage adjustment terminal coupled to the sensor output terminal of the second DC-DC converter circuit and to the sensor output terminal of the first DC-DC converter circuit.

27 Claims, 14 Drawing Sheets

(56) References Cited

OTHER PUBLICATIONS

Domenico et al., "Design of a 600 W HB LLC Converter Using 600 V CoolMOSTM P6," Infineon Technologies, Application Note, Revision 1.0, Jul. 31, 2015, pp. 1-42.

Frank, "TDA 4863—Technical Description AN-PFC-TDA 4863-1," Application Note, V 1.2, Oct. 2003, Infineon Technologies, Power Management & Supply, pp. 1-27.

On Semiconductor, Energy Efficient Innovations, "Power Factor Correction (PFC) Handbook, Choosing the Right Power Factor Controller Solution," HBD853/D, Rev. 5, Apr. 2014, pp. 1-130.

Infineon Technologies, "Standalone Power Factor Correction (PFC) Controller in Continuous Conduction Mode (CCM)," Type: ICE3PCS03G, Package PG-DSO-8, Apr. 28, 2010, pp. 5-21.

Jang et al., "Average Current Mode Control to Improve Current Distributions in Multi-Module Resonant dc-to-dc Converters," 8th International Conference on Power Electronics—ECCE Asia, May 30-Jun. 3, 2011, The Shilla Jeju, Korea, pp. 2312-2319.

Kim et al., "Analysis and Design of Two-Phase Interleaved LLC Resonant Converter Considering Load Sharing," Kyungpook National University. Downloaded on Jul. 1, 2010, UTC from IEEE Xplore, pp. 1141-1144.

Orietti et al., "Current Sharing in Three-Phase LLC Interleaved Resonant Converter," Kyungpook National University. Downloaded on Jul. 1, 2010, UTC from IEEE Xplore, pp. 1145-1152.

Orietti et al., "Analysis of Multi-Phase LLC Resonant Converters," Kyungpook National University. Downloaded on Jul. 1, 2010, UTC from IEEE Xplore, pp. 464-471.

Texas Instruments, "Natural Interleaving TM Transition-Mode PFC Controller with Improved Audible Noise Immunity," SLUSA07—Sep. 2011, UCC28063, pp. 1-46.

Texas Instruments, "Interleaving Continuous Conduction Mode PFC Controller," SLUS794E—Nov. 2007—Revised Apr. 2011, UCC28070, pp. 1-47.

Wang et al., "A ZVS-PWM Interleaved Boost DC/DC Converter," pp. 1-4.

Yi et al., "A Novel Two Phase Iterleaved LLC Series Resonant Converter Using a Phase of the Resonant Capacitor," Apr. 10, 2008, pp. 275-279.

\* cited by examiner

VOLTAGE ADJUSTMENT SYSTEM AND METHOD FOR PARALLEL-STAGE POWER CONVERTER

TECHNICAL FIELD

The present invention relates generally to a system and method for a power converter having multiple parallel stages, and, in particular embodiments, to a system and method for adjusting input voltages to parallel DC-DC converter stages.

BACKGROUND

AC-DC converters are useful for a variety of applications. These applications include providing power to telecommunications systems, office and industrial equipment, military systems, and consumer electronics. Consumer electronics devices that use AC-DC converters include laptop computers, desktop computers, monitors, routers, blue-ray players, printers, televisions, etc.

A variety of configurations may be used in AC-DC converter systems, including a configuration that includes a rectifier, a Power Factor Correction (PFC) stage, and a DC-DC converter stage. One type of DC-DC converter stage that may be used is a Switched Mode Power Supply (SMPS) DC-DC converter that includes energy storage elements and switching elements to switch energy to the converter output from these storage elements. The storage elements may include, for example, inductors and capacitors. The switching elements may include, for example, Metal Oxide Semiconductor Field Effect Transistors (MOSFETs). Some SMPS converters also provide galvanic isolation between their input and output using a transformer, and may have their switching elements located on the primary side of this transformer. Such SMPS converters may be capable of providing line regulation and load regulation of the converter output voltage.

SUMMARY

In accordance with a first example embodiment of the present invention, a method for power conversion is provided. The method includes performing, by a plurality of parallel stages, DC-DC conversion on a plurality of input signals to obtain a plurality of output signals each having a respective amplitude. The method also includes determining a plurality of measurement signals that each scale in accordance with the respective amplitude of one of the plurality of output signals, and adjusting, in accordance with the plurality of measurement signals, a respective voltage of at least one of the plurality of input signals.

In accordance with a second example embodiment of the present invention, a power circuit is provided. The power circuit includes a plurality of parallel stages configured to perform DC-DC conversion on a plurality of input signals to obtain a plurality of output signals each having a respective amplitude, and to determine a plurality of measurement signals each in accordance with the respective amplitude of one of the plurality of output signals. The power circuit is also configured to adjust, in accordance with the plurality of measurement signals, a respective input voltage of at least one of the plurality of input signals.

In accordance with a third example embodiment of the present invention, a power system is provided. The power system includes a first DC-DC converter circuit and a second DC-DC converter circuit, each including a power input terminal and a sensor. The sensor includes a sensor output terminal and at least one of a current sensor and a voltage sensor. The power system also includes a master Power Factor Correction (PFC) circuit that includes a power output terminal coupled to the power input terminal of the first DC-DC converter circuit; and a slave PFC circuit, which includes a power output terminal coupled to the power input terminal of the second DC-DC converter circuit and a voltage adjustment terminal coupled to the sensor output terminal of the second DC-DC converter circuit and to the sensor output terminal of the first DC-DC converter circuit.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF ILLUSTRATIVE EMBODIMENTS

Figure 1A:
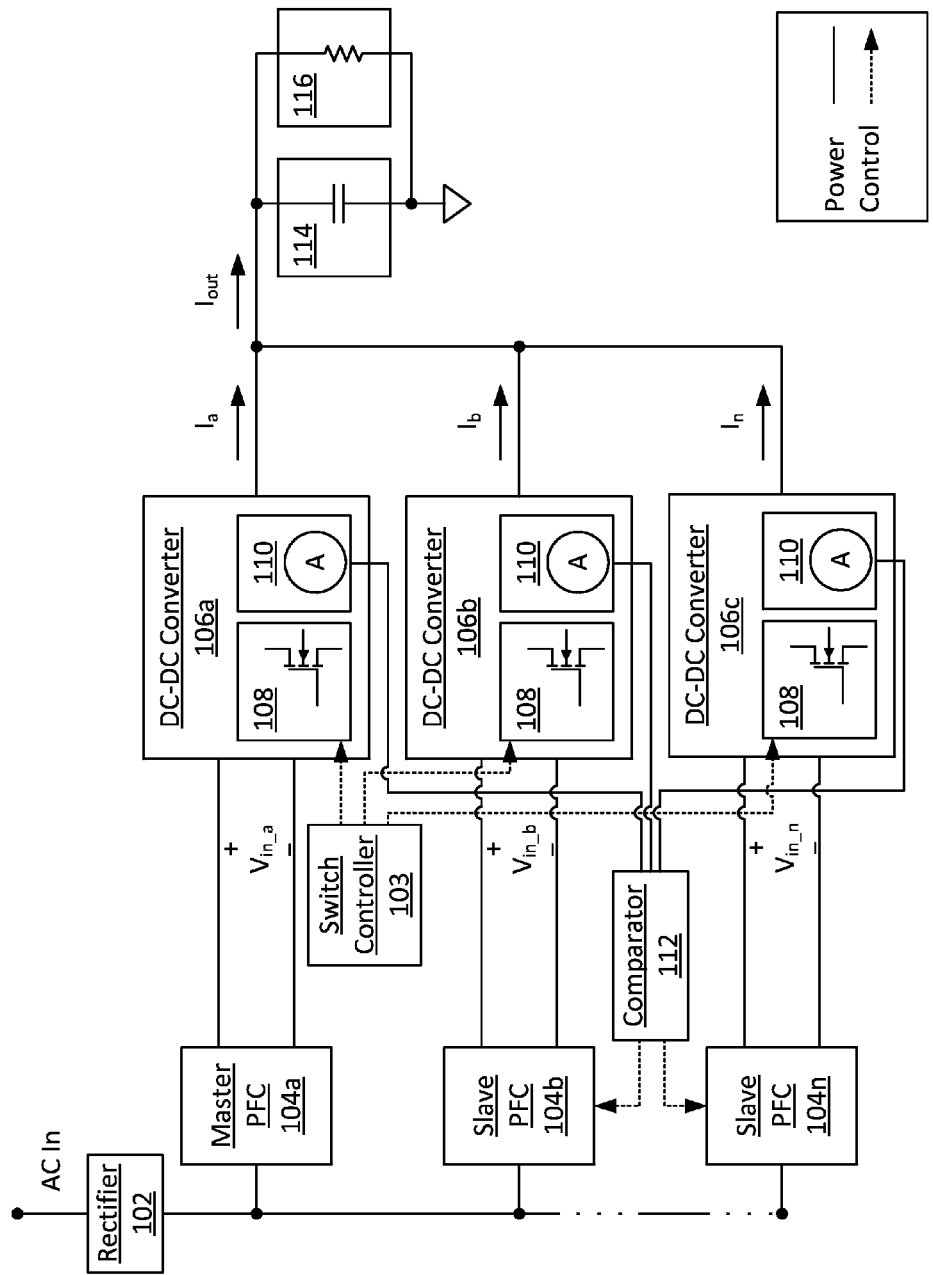
FIG. 1A is a block diagram illustrating an AC-DC converter that provides a filtered DC output current to an electrical load, in accordance with example embodiments described herein.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, systems and methods for AC-DC converters using multiple parallel PFC stages and multiple parallel DC-DC converter stages. Embodiments of the present invention may also be applied to other circuits including, but not limited to switched-mode power supplies and other types of power supply systems.

In various embodiments, an AC-DC converter provides a filtered output current to an electrical load. This AC-DC converter includes multiple parallel PFC stages that receive either AC power or rectified AC power, and each PFC stage provides power to a respective DC-DC converter stage. The multiple DC-DC converter stages have individual output currents that are combined to provide a total output current. Each of these individual output currents has a ripple component, but the switch banks of each DC-DC converter are timed with respect to the switch banks of the other DC-DC converters such that their individual output currents are interleaved, meaning the different current ripples reach their respective peak at different times. After the individual output currents are combined, the total output current has a ripple component that is provided across an output filter capacitor and a DC component provided across an electrical load connected in parallel with this capacitor. The output filter capacitor filters the current ripple from the output to the electrical load, and the size and expense of this capacitor typically scales with the amplitude of the output current ripple.

In a theoretical design using ideal components, the amplitude of the ripple in the individual output currents of the DC-DC converters could be designed to be the same so that interleaving would reduce the ripple of the total output current. In real-world implementations, however, each procured component has a tolerance that varies from the ideal. If left unchecked, these component tolerances could cause the amplitude of some individual output currents to be larger than that of the others, which would prevent the interleaved parallel-stage design from successfully decreasing the total output current ripple.

To mitigate the impact of these component tolerances, feedback may be provided from one or more of the DC-DC converter stages to one or more of the PFC stages to cause the latter to alter the voltages they provide. In an example embodiment having two parallel PFC stages each respectively coupled to two parallel DC-DC converter stages, one of the PFC stages may be a master PFC stage that is not controlled by its corresponding DC-DC converter stage, while the other PFC stage may be a slave PFC stage that is controlled by its corresponding DC-DC converter stage. In such an embodiment, the DC-DC converter stages directly or indirectly monitor the ripple amplitudes of their individual output currents and provide a control signal that causes the voltage provided by the slave PFC stage to increase or decrease. To provide ripple equalization of the individual output currents, the voltage provided by the slave PFC stage increases if its associated DC-DC converter stage has an output current with a ripple amplitude that is less than that of the other DC-DC converter stage, and the voltage provided by the slave PFC stage decreases if this ripple amplitude is greater than that of the other DC-DC converter stage.

FIG. 1A shows an AC-DC converter that provides a filtered DC output current to an electrical load 116. This AC-DC converter includes a master PFC stage 104a and one or more slave PFC stages 104b-104n. In the embodiment of FIG. 1A, the AC-DC converter also includes a rectifier 102. In other embodiments, bridgeless PFC stages that do not require a rectifier may be used.

Each of the PFC stages 104a-104n receives the same rectified AC voltage and current from rectifier 102, and each provides one of DC-DC converter input voltages $V_{in\_a}$-$V_{in\_n}$ to a respective one of the DC-DC converter stages 106a-106n. The PFC stages 104a-104n may use operational modes such as, for example, critical conduction mode PFC, discontinuous conduction mode PFC, continuous conduction mode PFC, interleaved PFC, and fixed-frequency Pulse-Width Modulation (PWM). The DC-DC converter stages 106a-106n may include frequency-modulated LLC converters, PWM converters, etc., and may use topologies such as, for example, Single-Transistor Forward (STF), Two-Transistor Forward (TTF), Interleaved TTF (ITTF), phase shift Zero Voltage Switching (ZVS), push-pull, active-clamp, hard switching, half-bridge switching, and full-bridge switching. In the embodiment of FIG. 1A, the parallel DC-DC converter stages 106a-106n each have a switch bank 108 and a current sensor 110. In other embodiments, a voltage sensor may be used in lieu of the current sensor 110.

Referring again to FIG. 1A, the DC-DC converter stages 106a-106n provide individual output currents $I_a$-$I_n$ that are combined to provide a total output current $I_{out}$ that has a DC component provided across the load and a ripple component provided across the parallel-connected output capacitor. Each of the individual output currents $I_a$-$I_n$ has a ripple component, but the switch banks 108 of the DC-DC converters have switching times controlled by switch controller 103 such that the individual output currents $I_a$-$I_n$ are interleaved, meaning their different current ripples reach their respective peak at different times.

Each of the individual output currents $I_a$-$I_n$ is monitored, either directly or indirectly, by the current sensor 110 of its respective DC-DC converter stage. The sensed amplitudes of these individual output currents $I_a$-$I_n$ provided to a comparator stage 112, which provides control signals to each of the slave PFC stages 104b-104n. Based on these PFC control signals, the voltages provided by the slave PFC stages 104b-104n are increased, decreased, or kept the same relative to the voltage provided by the master PFC stage 104a, in accordance with the relative sensed amplitudes of the individual output currents $I_a$-$I_n$. For example, if the sensed amplitude of $I_n$ is less than that of $I_a$, then the comparator stage 112 will cause slave PFC stage 104n to increase the voltage $V_{in\_n}$, and if the sensed amplitude of $I_n$ is greater than that of $I_a$, then the comparator stage 112 will cause slave PFC stage 104n to decrease the voltage $V_{in\_n}$. After the individual output currents $I_a$-$I_n$ are combined, the total output current $I_{out}$ has a ripple component that is filtered by an output capacitance bank 114 connected in parallel with the electrical load 116.

Figure 1B:
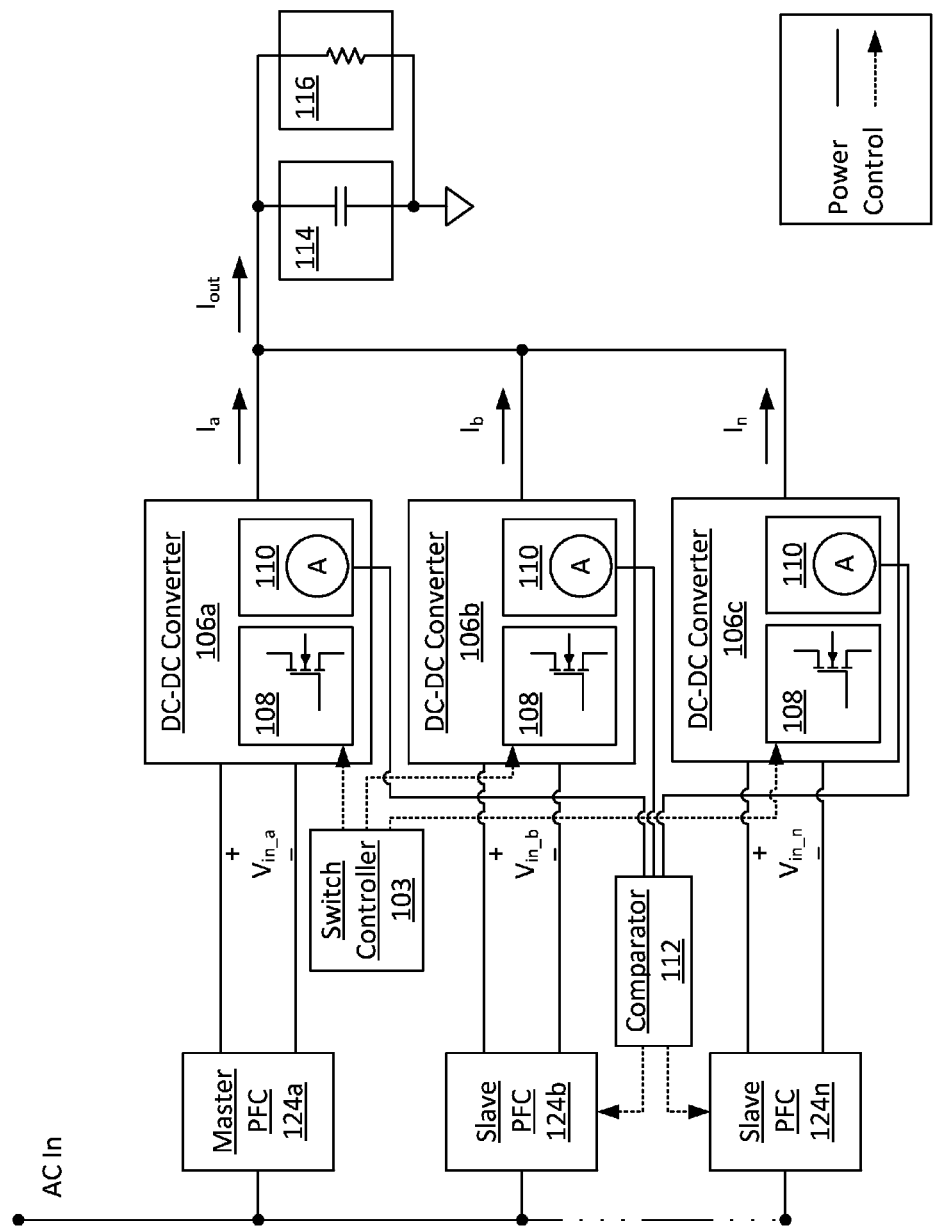
FIG. 1B is a block diagram illustrating an alternative embodiment of the AC-DC converter, in accordance with example embodiments described herein.

FIG. 1B shows an alternative embodiment of the AC-DC converter. The only difference from the embodiment of FIG. 1A is that the PFC stages are bridgeless PFC stages 124a-124n, and therefore no rectifier is required to rectify the AC power that is input to these PFC stages.

Figure 2A:
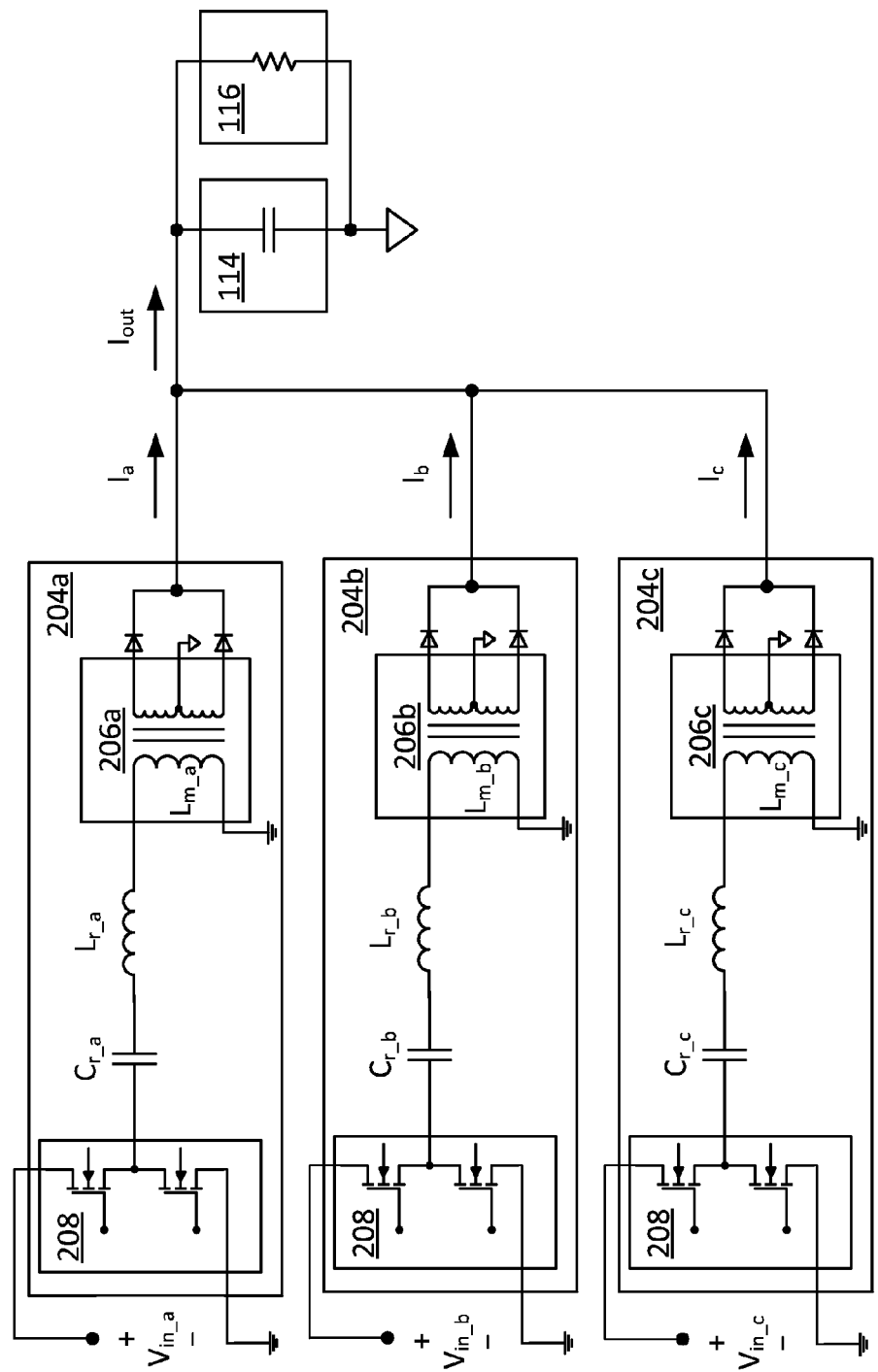
FIG. 2A is a block diagram illustrating three parallel resonant LLC converter stages that may be used as DC-DC converter stages for an AC-DC converter in accordance with example embodiments described herein.

FIG. 2A shows embodiment resonant LLC converter stages 204a-204c that may be used as DC-DC converter stages for an embodiment AC-DC converter that has three parallel interleaved DC-DC converter stages. LLC converter stages 204a-204c respectively have resonance capacitances $C_{r\_a}$-$C_{r\_c}$, resonance inductances $L_{r\_a}$-$L_{r\_c}$, and transformers 206a-206c having magnetizing inductances $L_{m\_a}$-$L_{m\_c}$ and turns ratios $N_a$-$N_c$. In some embodiments, the resonance inductances $L_{r\_a}$-$L_{r\_c}$ are implemented as respective leakage inductances of the transformers 206a-206c. Each of the LLC converter stages 204a-204c has a switch bank 208 that switches at the same frequency, and the switch banks 208 have coordinated timing such that the output current $I_c$ of LLC stage 204c is phase-delayed by 60 degrees relative to the output current $I_b$ of LLC stage 204b, which is in turn phase-delayed by 60 degrees relative to the output current $I_a$ of LLC stage 204a.

Figure 2B:
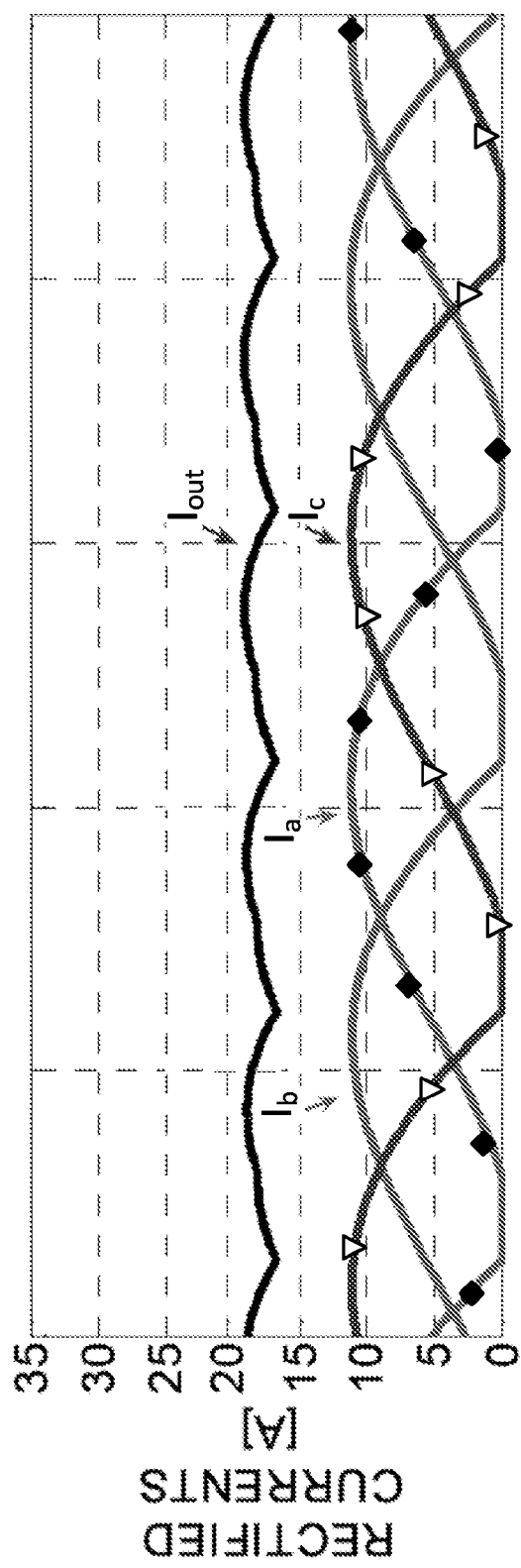
FIG. 2B is a graph illustrating the predicted individual output currents of a design for the interleaved LLC converter stages of FIG. 2A having ideal components with equal values and equipotential input voltages in accordance with example embodiments described herein.

FIG. 2B shows the predicted individual output currents $I_a$-$I_c$ of a design for the interleaved LLC converter stages 204a-204c such that the voltages $V_{in\_a}$-$V_{in\_c}$ to be respectively applied to the LLC converter stages 204a-204c are designed to be all exactly equal, and ideal component values are selected such that $L_{r\_a}$-$L_{r\_c}$ are all exactly equal, $L_{m\_a}$-$L_{m\_c}$ are all exactly equal, $C_{r\_a}$-$C_{r\_c}$ are all exactly equal, and $N_a$-$N_c$ are all exactly equal. Under such an ideal design, the gain of the three LLC converter stages 204a-204c would be the same and the individual output currents $I_a$-$I_c$ of the LLC converter stages 204a-204c would have current ripple with the same amplitude. When the individual output currents are added together, the troughs of the half-waves in their ripple components are canceled in the resulting total output current $I_{out}$. This total output current $I_{out}$ thus has a reduced ripple component relative to that of any of the individual output currents $I_a$-$I_c$.

Figure 2C:
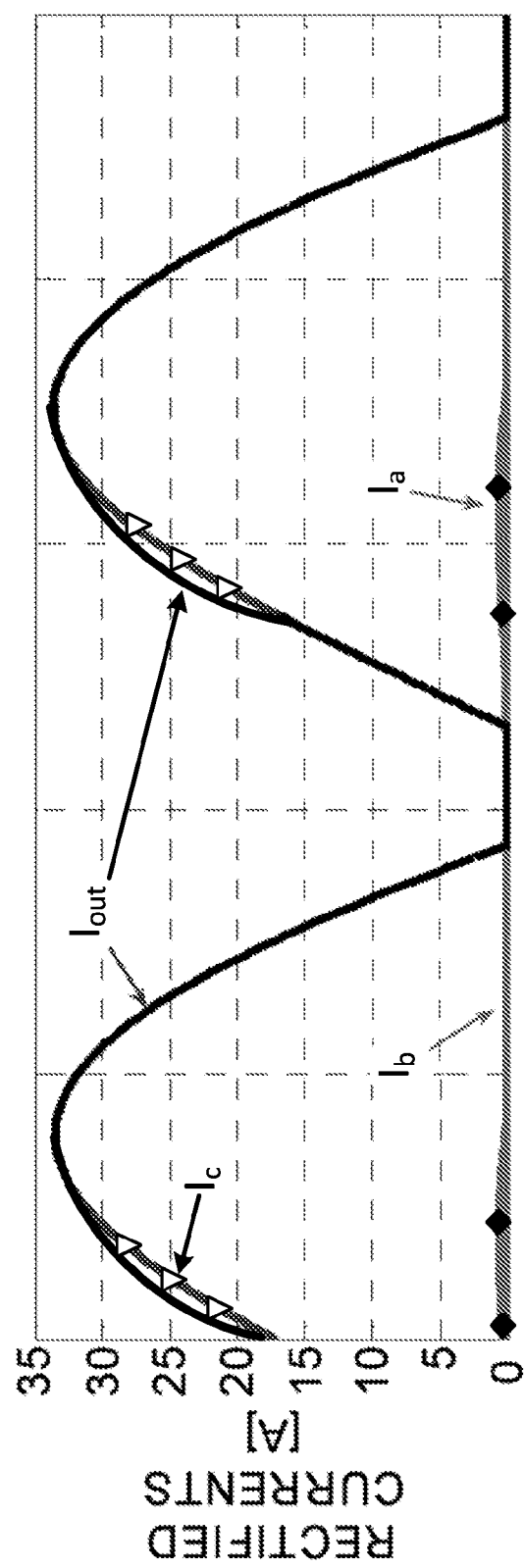
FIG. 2C is a graph illustrating the predicted individual output currents of a design for the interleaved LLC converter stages of FIG. 2A having components with unequal values in accordance with example embodiments described herein.

FIG. 2C shows one example of the predicted individual output currents $I_a$-$I_c$ and total output current $I_{out}$ if, to reflect real-world variations in LLC components, some of the LLC component values are altered relative to those described for FIG. 2B. In the example of FIG. 2C, the resonance capacitances $C_{r\_a}$-$C_{r\_c}$ are not equal to each other, and in particular $C_{r\_b}$ is 1.1 times the value of $C_{r\_a}$ and $C_{r\_c}$ is 0.9 times the value of $C_{r\_a}$. If such component values were to be used without any feedback control, the ripple amplitudes of the individual output currents $I_a$-$I_c$ of the LLC converter stages 204a-204c would not be the same. The ripple amplitude of the output current $I_c$ would be greater than that of $I_a$ and $I_b$. When these individual output currents are added together, the troughs of $I_c$ are for the most part not canceled in the resulting total output current $I_{out}$, which thus retains a large ripple amplitude.

Figure 3A:
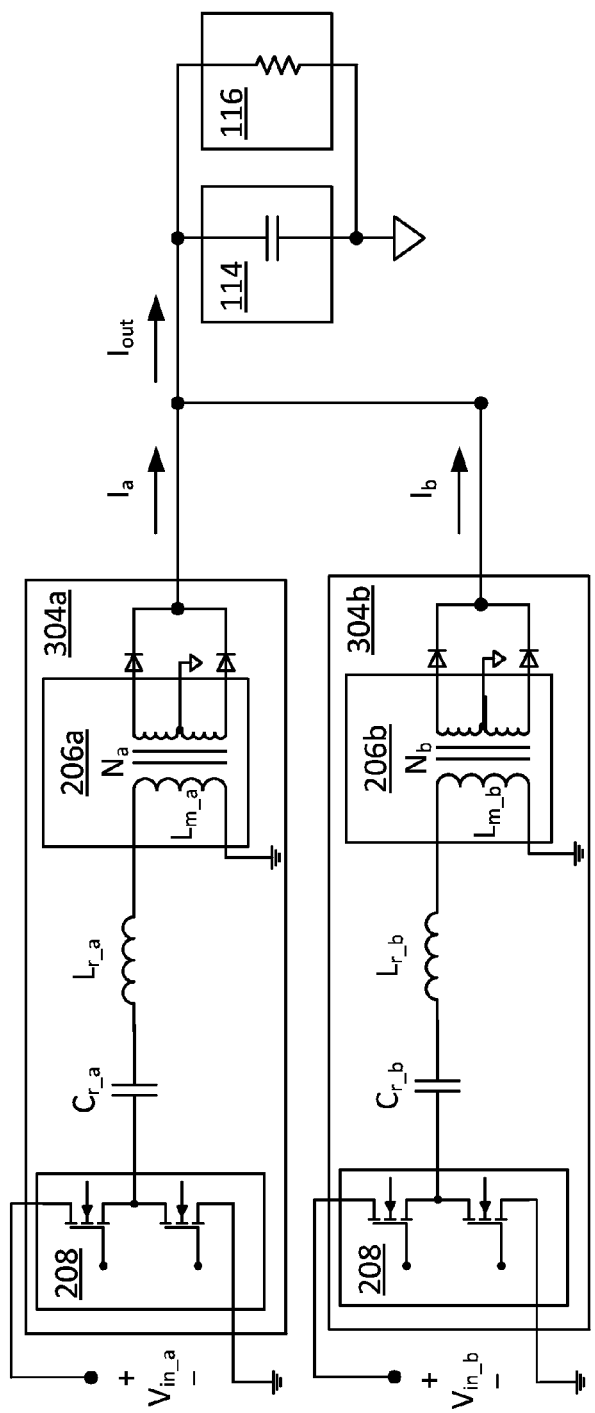
FIG. 3A is a block diagram illustrating two parallel LLC converter stages that may be used as DC-DC converter stages for an AC-DC converter in accordance with example embodiments described herein.

FIG. 3A shows embodiment resonant LLC converter stages 304a and 304b that may be used as DC-DC converter stages for an embodiment AC-DC converter that has two parallel interleaved DC-DC converter stages delivering power to a load 116 coupled across an output filter capacitor 114. The LLC converter stages 304a and 304b may be identical to the LLC converter stages 204a and 204b of FIG. 2A, except that the control signals to their switch banks 208 have coordinated timing such that the output current $I_b$ of LLC stage 304b is phase-delayed by 90 degrees relative to the output current $I_a$ of LLC stage 304a, since there are only two parallel LLC converter stages instead of three.

Figure 3B:
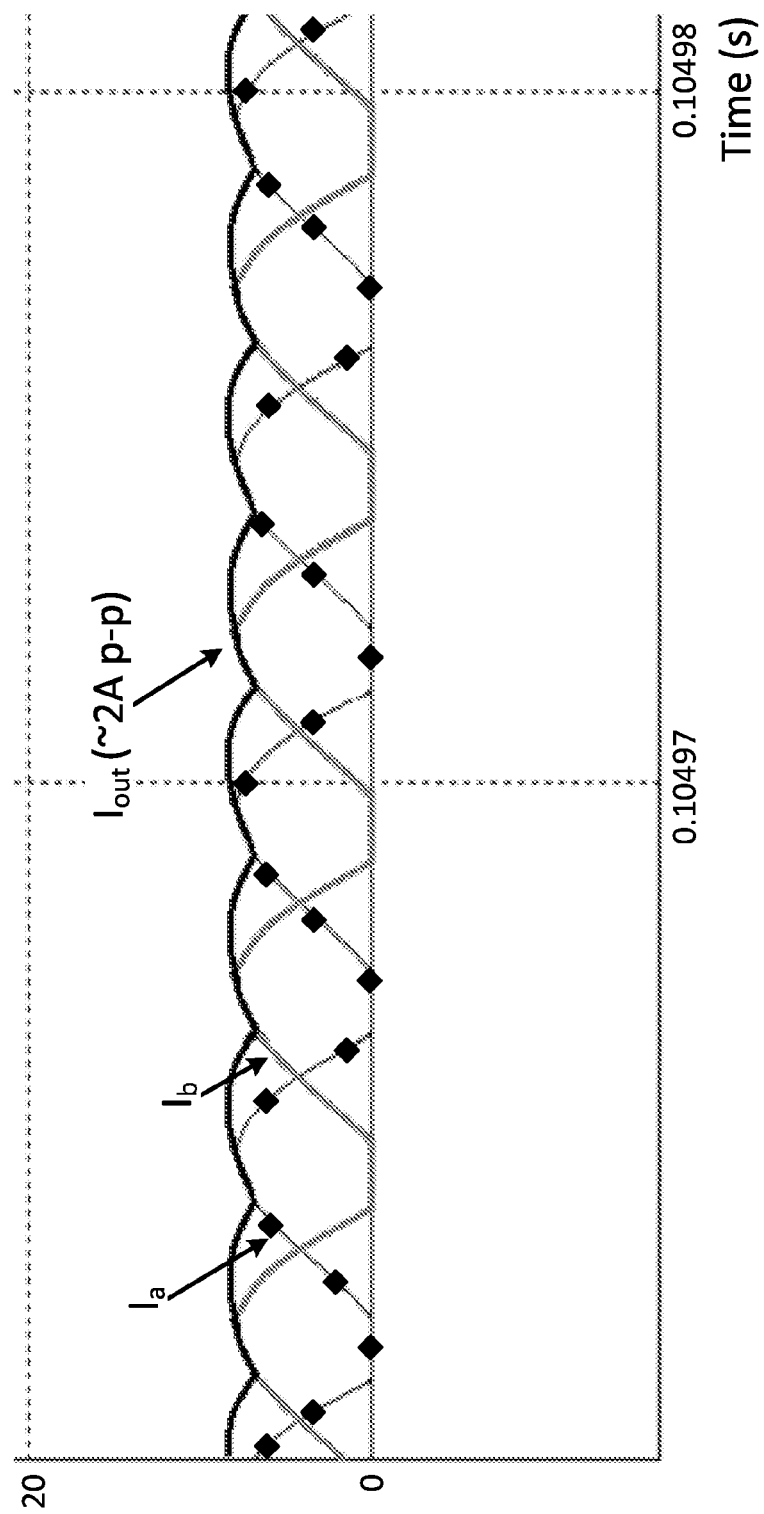
FIG. 3B is a graph illustrating the predicted individual output currents of a design for the interleaved LLC converter stages of FIG. 3A having ideal components with equal values in accordance with example embodiments described herein.

FIG. 3B shows the predicted individual output current $I_a$ and $I_b$ of a design for the interleaved LLC converter stages 304a and 304b such that the voltages $V_{in\_a}$ and $V_{in\_b}$ to be respectively applied to the LLC converter stages 304a and 304b are designed to be exactly equal to 390 volts, and ideal component values are selected such that $L_{r\_a}$ and $L_{r\_b}$ are both exactly equal to 80 µH, the sums of $L_{r\_a}$ plus $L_{m\_a}$ and $L_{r\_b}$ plus $L_{m\_b}$ are both exactly equal to 480 µH, $C_{r\_a}$ and $C_{r\_b}$ are both exactly equal to 20 nF, and $N_a$ and $N_b$ are both exactly equal to 36 primary turns divided by 8 secondary turns. Under such an ideal design, the gain of the LLC converter stages 304a and 304b would be the same and they would have the same resonant frequency of approximately 126 kHz. In the embodiment of FIG. 3B, the predicted output currents are for a switching frequency of 100 kHz which would result in an output voltage of approximately 50V, the DC component of which is provided across a load resistance of 6.25 ohms of the load 116. Under such conditions, the individual output currents $I_a$ and $I_b$ of the LLC converter stages 304a and 304b would have the same amplitude equal to approximately 8 A peak-to-peak. When these out-of-phase output currents are added together, the troughs of their ripple components are canceled in the resulting total output current $I_{out}$. This ripple component of this total output current $I_{out}$ that is provided across the output filter capacitor 114 thus has a ripple amplitude of approximately 2 A peak-to-peak, which is reduced relative to the 8 A peak-to-peak amplitude of the ripple components of the individual output currents $I_a$ and $I_b$. By contrast, if load sharing were to be performed solely by changing the switching frequency of one or both of the LLC converter stages 304a-304b without any other modification, the ripple component of $I_{out}$ may not be reduced.

Figure 3C:
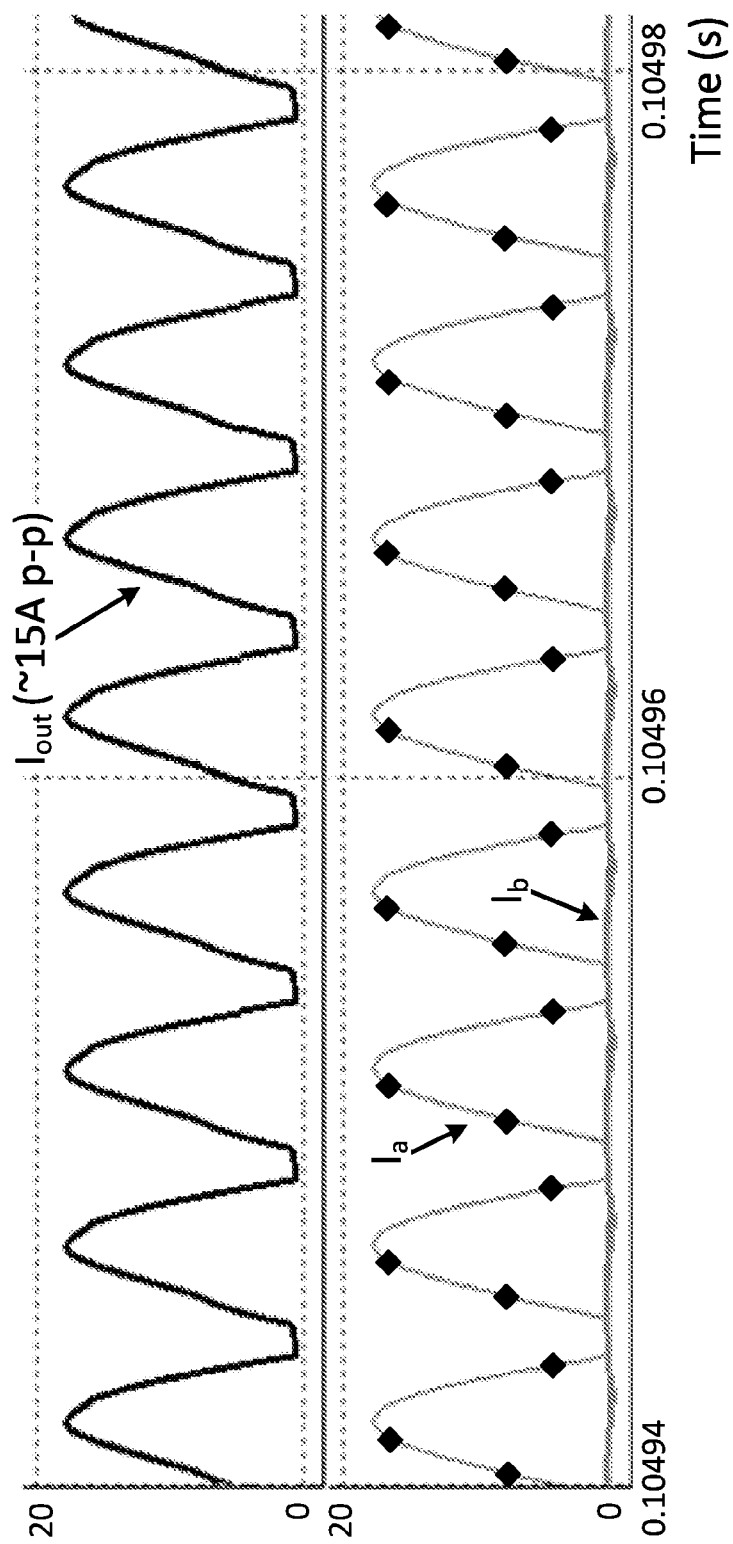
FIG. 3C is a graph illustrating the predicted individual output currents of a design for the interleaved LLC converter stages of FIG. 3A having components with unequal values and equipotential input voltages in accordance with example embodiments described herein.

FIG. 3C shows an example of the predicted individual output current $I_a$ and $I_b$ and the total output current $I_{out}$ if, to reflect real-world variations in LLC components, some of the LLC component values are altered relative to those described for FIG. 3B. In the embodiment of FIG. 3C, $L_{r\_b}$ and $C_{r\_b}$ are each increased to be 5% larger than $L_{r\_a}$ and $C_{r\_a}$, respectively, with $L_{r\_b}$ having an inductance value of 84 µH and $C_{r\_b}$ having a capacitance value of 21 nF, resulting in a decreased resonant frequency of LLC stage 304b that is approximately 120 kHz. If such component values were to be used, the ripple amplitudes of the individual output currents $I_a$ and $I_b$ of the LLC converter stages 304a and 304b would not be the same. The ripple amplitude of the output current $I_a$ would be at least an order of magnitude greater than that of the output current $I_b$. When these individual output currents are added together, the troughs of $I_a$ are for the most part not canceled in the resulting total output current $I_{out}$, which thus retains a large ripple amplitude of approximately 15 A peak-to-peak.

Figure 3D:
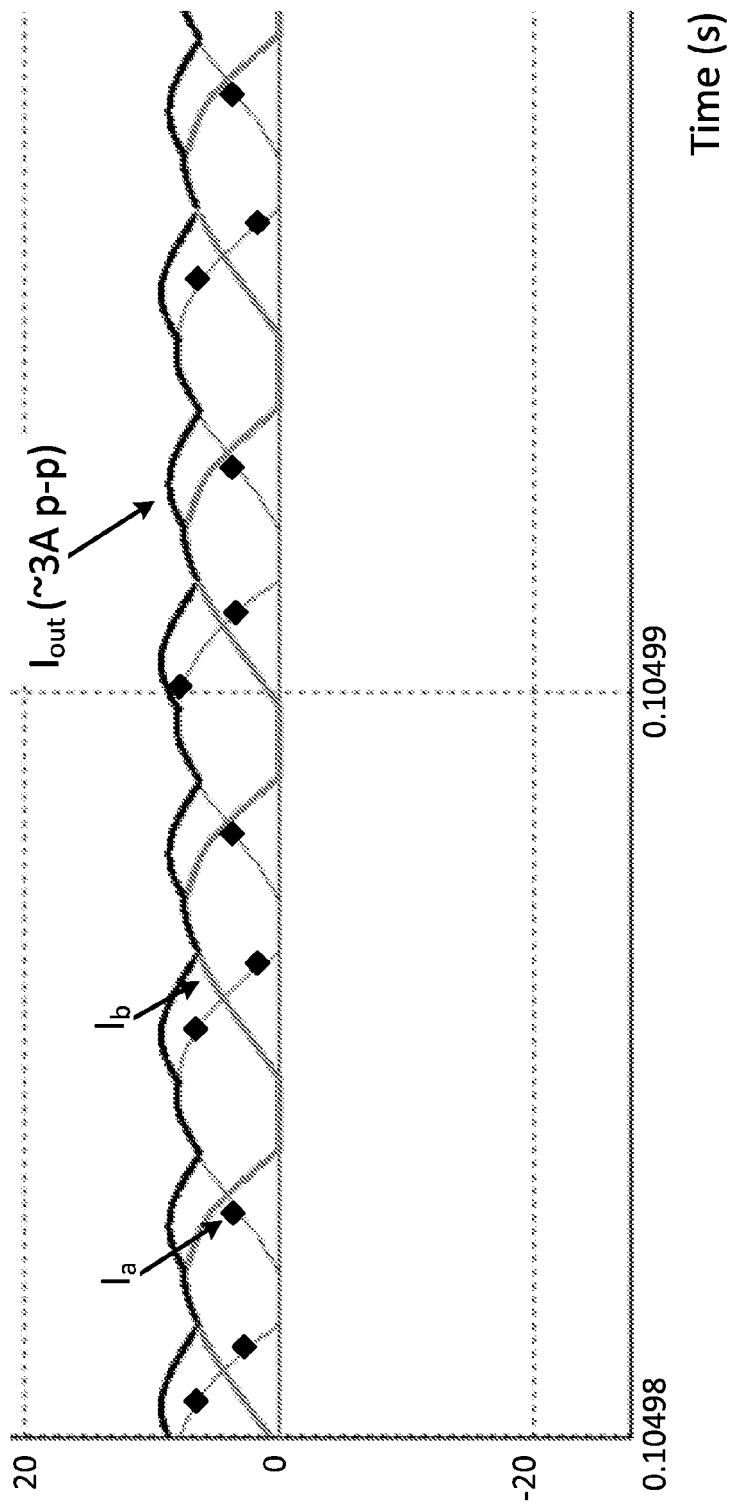
FIG. 3D is a graph illustrating the predicted individual output currents of a design for the interleaved LLC converter stages of FIG. 3A having components with unequal values and feedback-adjusted input voltages in accordance with example embodiments described herein.

FIG. 3D shows an example of the predicted individual output current $I_a$ and $I_b$ and the total output current $I_{out}$ if the LLC input voltage $V_{in\_b}$ is altered relative to that described for FIG. 3C by using feedback to a slave PFC stage that provides this voltage. In the embodiment of FIG. 3D, $V_{in\_b}$ has been increased to 404.3V, while $V_{in\_a}$ remains at 390V. Under such conditions, the ripple amplitude of the output current $I_a$ would be only slightly smaller than that of output current $I_b$. When these individual output currents are added together, the troughs of their ripple components are for the most part canceled in the resulting total output current $I_{out}$.

The ripple component of this total output current $I_{out}$ that is provided across the output filter capacitor 114 thus has a reduced ripple amplitude of approximately 3 A peak-to-peak, which is only slightly greater than the 2 A peak-to-peak amplitude of the total output ripple component under the theoretical design of FIG. 3B that uses ideal components.

Figure 4A:
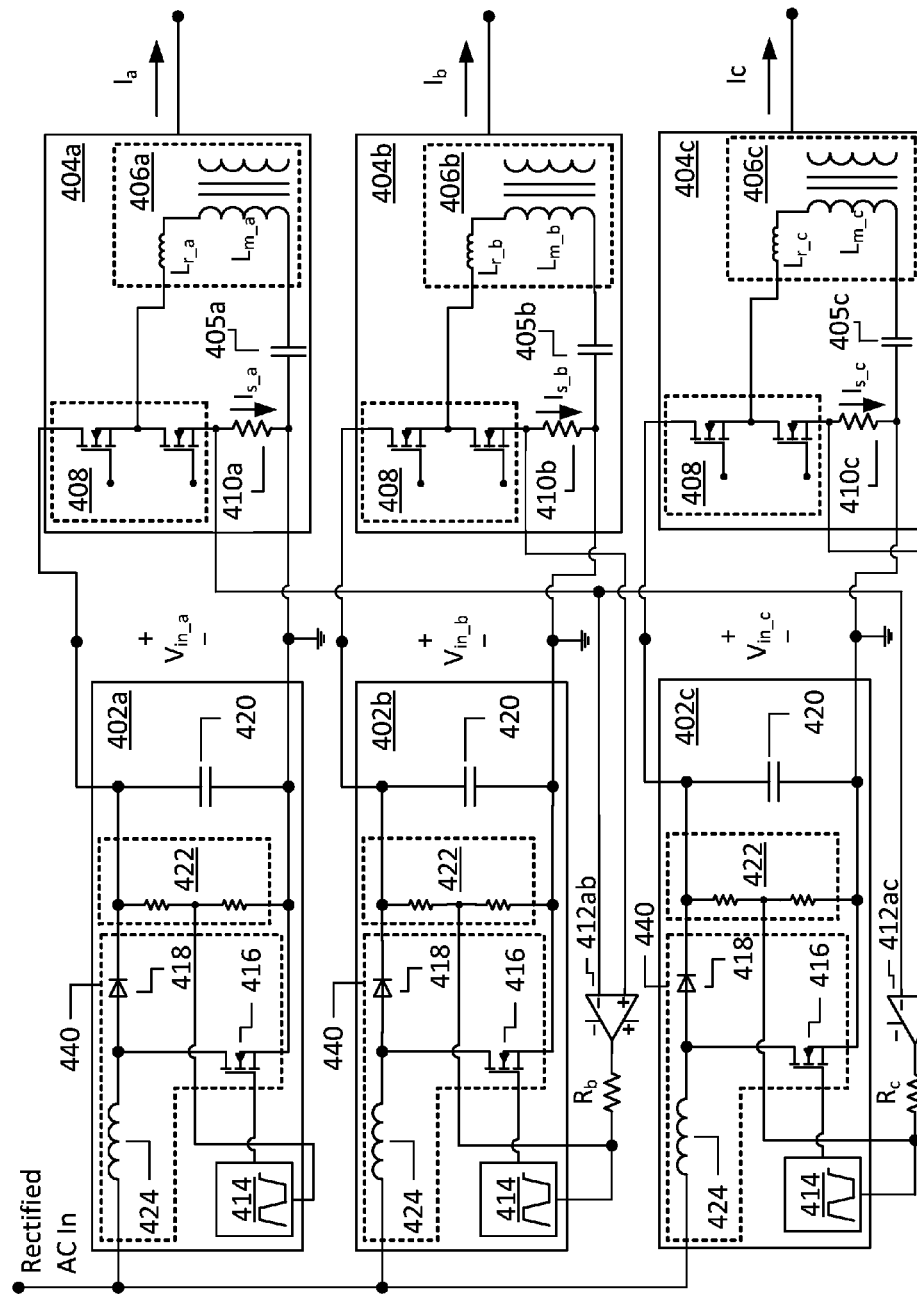
FIG. 4A is a block diagram illustrating an AC-DC converter having three resonant LLC DC-DC converter stages each coupled to a different parallel PFC stage in accordance with example embodiments described herein.

FIG. 4A shows embodiment PFC stages 402a-402c coupled to LLC converter stages 404a-404c that may be respectively used as the PFC stages and DC-DC converter stages of the three-path interleaving AC-DC converter of FIG. 1A. In the embodiment of FIG. 4A, PFC stage 402a is a master PFC stage and PFC stages 402b-402c are slave PFC stages, and the comparator 112 of FIG. 1A has been implemented as two error amplifiers 412ab and 412ac that provide feedback from the LLC converter stages 404a-404c to the slave PFC stages to cause the latter to alter the voltages they provide.

Each of the PFC stages 402a-402c includes a PFC regulator 414, a DC link capacitance bank 420, a resistive voltage divider 422, and a switching stage 440 that includes a PFC switch 416, a PFC diode 418, and an inductive choke 424. Since the DC link capacitance banks 420 charge more during the peaks of the rectified AC voltage provided to the PFC stages 402a-402c, the PFC regulator 414 and PFC switch 416 are used to reduce the resulting phase difference that would occur between the rectified AC voltage and rectified AC current. In the embodiment of FIG. 4A, this PFC regulator 414 uses frequency control to perform this phase adjustment. Other embodiments may use any of the various PFC control schemes known in the art, including, for example, PWM with fixed frequency. The PFC regulator 414 of FIG. 4A may be implemented, for example, as an Integrated Circuit (IC) such as an Application Specific IC (ASIC), or as a Field Programmable Gate Array (FPGA) or other programmable or non-programmable microcontroller. Further examples of such microcontrollers include the Infineon TDA 4863 controller IC and the Infineon ICE3PCS03G controller IC.

LLC converter stages 404a-404c have resonance tank circuits that respectively include resonance capacitors 405a-405c in series with transformers 406a-406c. These resonance capacitors 405a-405c may have capacitances that are not identical to each other due to, for example, production process variation or other random sources of variation. The transformers 406a-406c of the LLC converter stages 404a-404c have magnetizing inductances that are also not identical and resonant leakage inductances that are also not identical.

Each of the LLC converter stages 404a-404c has a switch bank 408 that switches at the same frequency, and the switch banks 408 have coordinated timing such that the output current $I_c$ of LLC stage 404c is phase-delayed by 60 degrees relative to the output current $I_b$ of LLC stage 404b, which is in turn phase-delayed by 60 degrees relative to the output current $I_a$ of LLC stage 404a. LLC converter stages 404a-404c also respectively include primary-side shunt resistors 410a-410c that have respective resistance values $R_{s\_a}$-$R_{s\_c}$, and each of these shunt resistors 410a-410c is coupled between the lowest voltage terminal of each of the switch banks 408 and the anode of each of the resonance capacitors 405a-405c, respectively. The shunt resistors 410a-410c are used to sense shunt voltages that are each respectively the product of shunt currents $I_{s\_a}$-$I_{s\_c}$ and shunt resistance values $R_{s\_a}$-$R_{s\_c}$. The current flowing through each of these shunt resistors 410a-410c is the resonant tank current, which also flows through the primary windings of the transformers 406a-406c that are magnetically coupled to the respective power outputs of the LLC converters 404a-404c. These primary-side shunt currents $I_{s\_a}$-$I_{s\_c}$ have amplitudes that respectively increase and decrease in accordance with increasing and decreasing ripple amplitudes of output currents $I_a$-$I_c$ of the LLC converter stages 404a-404c, in accordance with the respective turns ratios of the LLC converters 404a-404c, and in accordance with the electrical load.

The shunt voltages measured across the shunt resistors 410a and 410b are provided as inputs to a first error amplifier 412ab, and the shunt voltages measured across the shunt resistors 410b and 410c are provided as inputs to a second error amplifier 412ac. Error amplifier 412ab outputs a control signal that is proportional to the difference in the amplitudes of the shunt currents $I_{s\_a}$ and $I_{s\_b}$. Similarly, error amplifier 412ac outputs a control signal that is proportional to the difference in the amplitudes of the shunt currents $I_{s\_a}$ and $I_{s\_c}$.

The voltage dividers 422 of the PFC stages 402a-402c are coupled across the voltages $V_{in\_a}$-$V_{in\_c}$ that are provided to the LLC converter stages 404a-404c. These voltage dividers 422 each have a respective center tap between resistors connected in series. From the center tap of these voltage dividers 422, a voltage sense signal is provided as a PFC adjustment signal to adjust the frequency control of the PFC regulators 414. In PFC stage 402a, a voltage level of the PFC adjustment signal is proportional to $V_{in\_a}$, and this PFC adjustment signal is used by the PFC regulator 414 and the PFC switch 416 to adjust the voltage $V_{in\_a}$ provided by slave PFC stage 402b to LLC stage 404b.

In slave PFC stage 402b, the output of error amplifier 412ab is passed through a resistance $R_b$ and is coupled to the voltage divider 422 to increase the level of its PFC adjustment signal for adjusting the voltage $V_{in\_b}$ provided by slave PFC stage 402b to LLC stage 404b. The amount of resistance $R_b$ may be selected to adjust the voltage variation range of the voltage $V_{in\_b}$. The PFC adjustment signal is then used to adjust the frequency control of the PFC regulator 414 of slave PFC stage 402b to reduce the amount of the difference between the amplitudes of $I_{s\_a}$ and $I_{s\_b}$. When the PFC adjustment signal indicates that shunt current $I_{s\_b}$ is greater than $I_{s\_a}$, the switching frequency of the PFC switch 416 of slave PFC stage 402b is adjusted such that the voltage $V_{in\_b}$ is reduced, and when the PFC adjustment signal indicates that shunt current $I_{s\_a}$ is greater than $I_{s\_b}$, the switching frequency of the PFC switch 416 of slave PFC stage 402b is adjusted such that the voltage $V_{in\_b}$ is increased. For example, in PFC embodiments that use conduction mode, the voltage $V_{in\_b}$ may be increased by decreasing the switching frequency of PFC stage 402b. In other embodiments, such as PFC embodiments that use PWM fixed frequency control, the voltage $V_{in\_b}$ may be increased by increasing duty cycle.

Referring again to the embodiment of FIG. 4A, similar to what occurs in slave PFC stage 402b, the output of error amplifier 412bc is passed through a resistance $R_c$ and is then used to increase the voltage level of the signal for adjusting the frequency control of PFC regulator 414 of slave PFC stage 402c such that the amount of the difference between the amplitudes of $I_{s\_a}$ and $I_{s\_b}$ is reduced. The amount of resistance $R_c$ may be selected to adjust the voltage variation range of the voltage $V_{in\_c}$ provided by slave PFC stage 402c to LLC stage 404c.

Figure 4B:
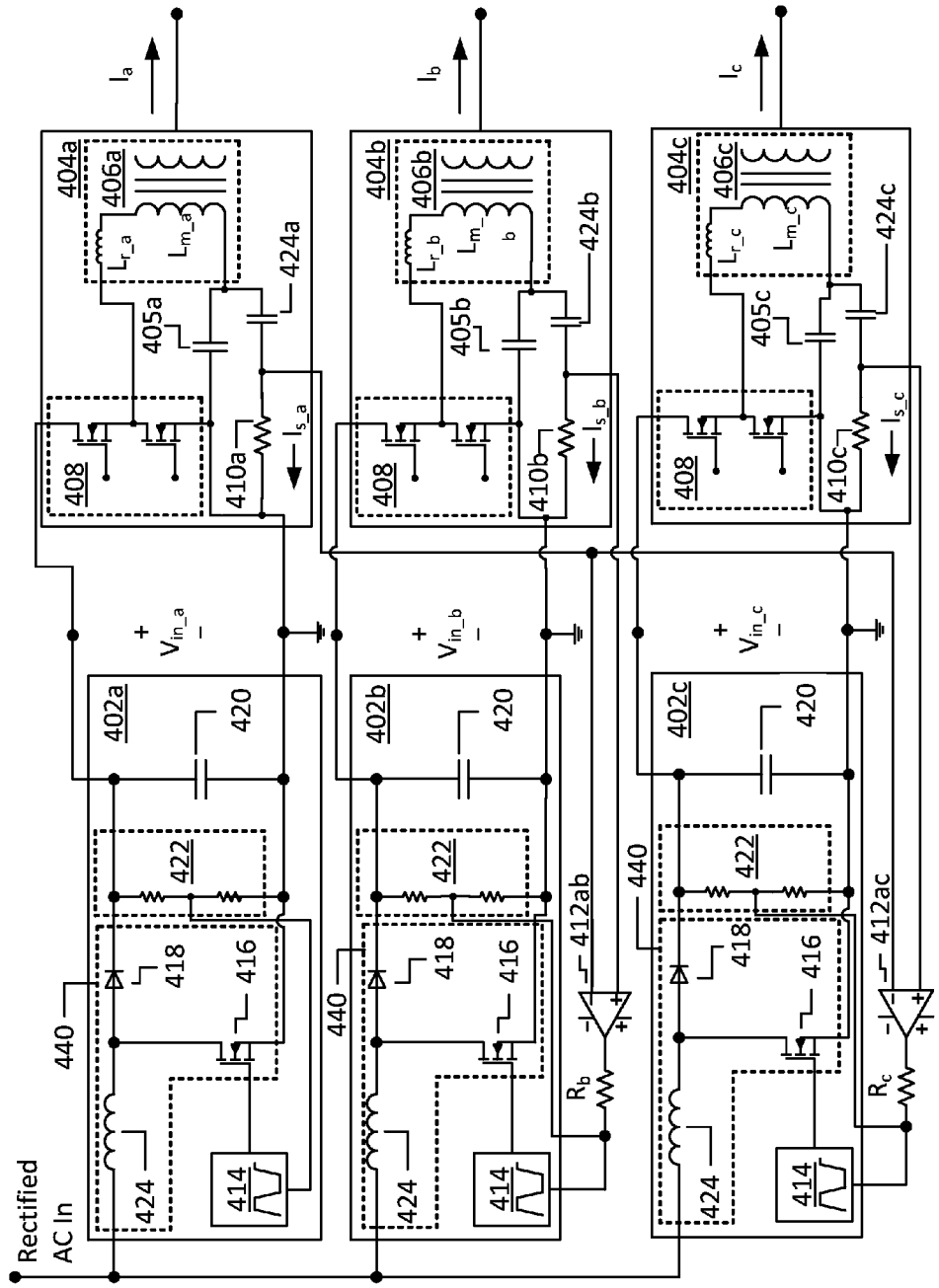
FIG. 4B is a block diagram illustrating a first alternative embodiment of the AC-DC converter of FIG. 4A, in accordance with example embodiments described herein.

FIG. 4B shows an alternative embodiment of the LLC converter stages 404a-404c of FIG. 4A in which the LLC converter stages 404b-404c also respectively include shunt capacitors 424b-424c, and in which the shunt resistors 410b and 410c have been relocated outside the resonant tank. In the embodiment of FIG. 4B, each of these shunt capacitors 424b and 424c is located in a respective parallel branch of its corresponding LLC primary-side circuit. In the embodiment of FIG. 4B, shunt resistors 410b and 410c have been relocated such that they are coupled in series to the anode of these shunt capacitors 424b and 424c within the parallel branches, the parallel branches are connected in parallel with the resonance capacitors 405b and 405c, and the error amplifiers 412ab and 412ac measure the voltages at the junctions that join the shunt capacitors 424b and 424c to the shunt resistors 410b and 410c, respectively.

Figure 4C:
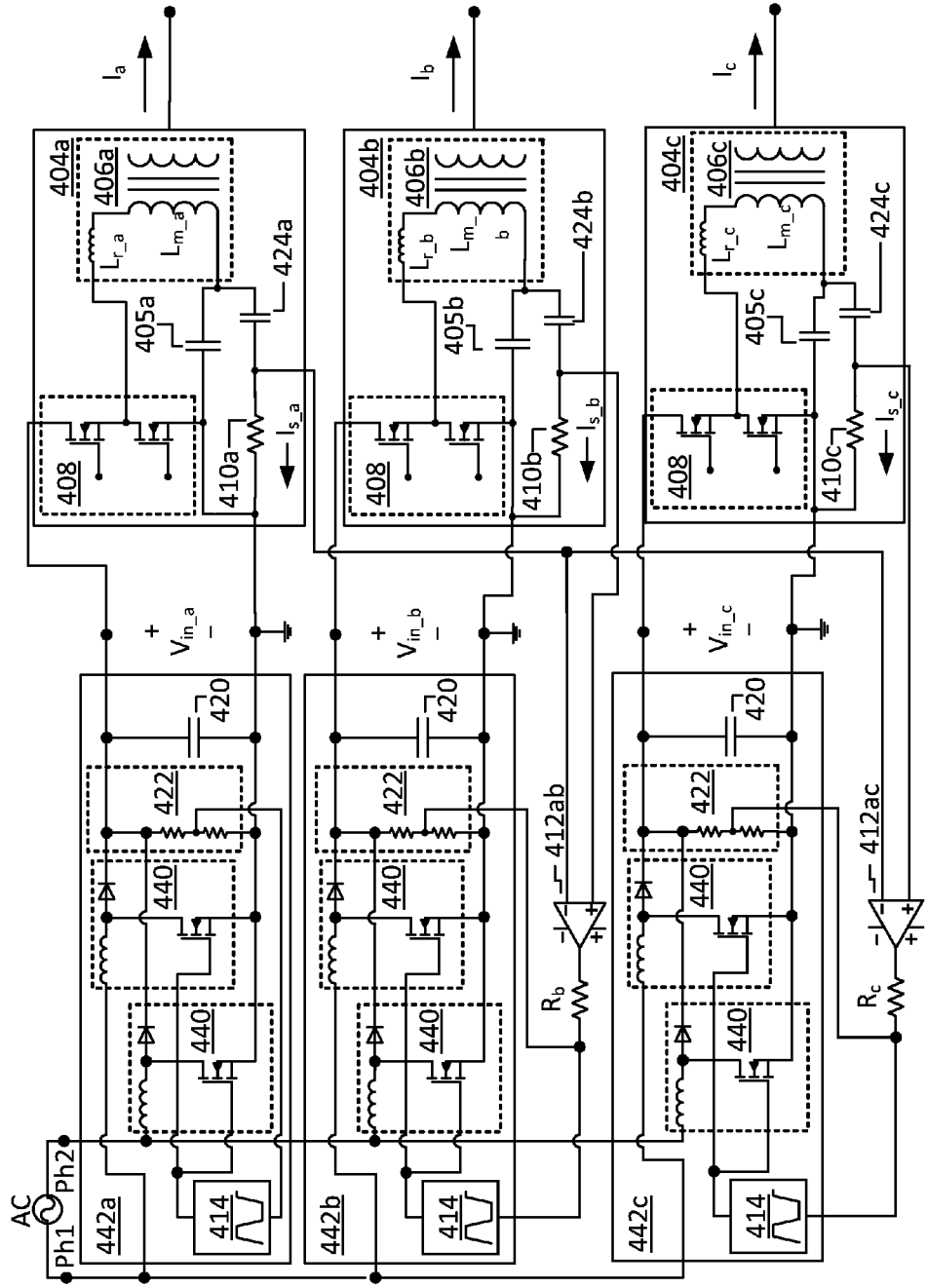
FIG. 4C is a block diagram illustrating a second alternative embodiment of the AC-DC converter of FIG. 4A, in accordance with example embodiments described herein.

FIG. 4C shows another alternative embodiment of the AC-DC converter of FIG. 4A. The embodiment of FIG. 4C is the same as the embodiment of FIG. 4B, except that bridgeless PFC stages 442a-442c are used to perform power factor correction on an AC signal instead of a rectified AC signal. Each of these bridgeless PFC stages has two switching stages 440 that each receive a respective one of the two phases of the AC signal. The voltages that are provided as outputs of the pair of switching stages 440 of each of bridgeless PFC stages 442a-442c are respectively combined together to provide the voltages $V_{in\_a}$-$V_{in\_c}$. These voltages $V_{in\_c}$ are input voltages to LLC converter stages 404a-404c, which each respectively measure a current through a shunt resistor 410a located in a parallel branch circuit located outside the resonant tank. In other embodiments, bridgeless PFC stages may be used to provide input voltages to LLC converter stages that each respectively measure current flowing through a shunt resistor located inside the resonant tank, in a manner similar to the embodiment of FIG. 4A.

Figure 5:
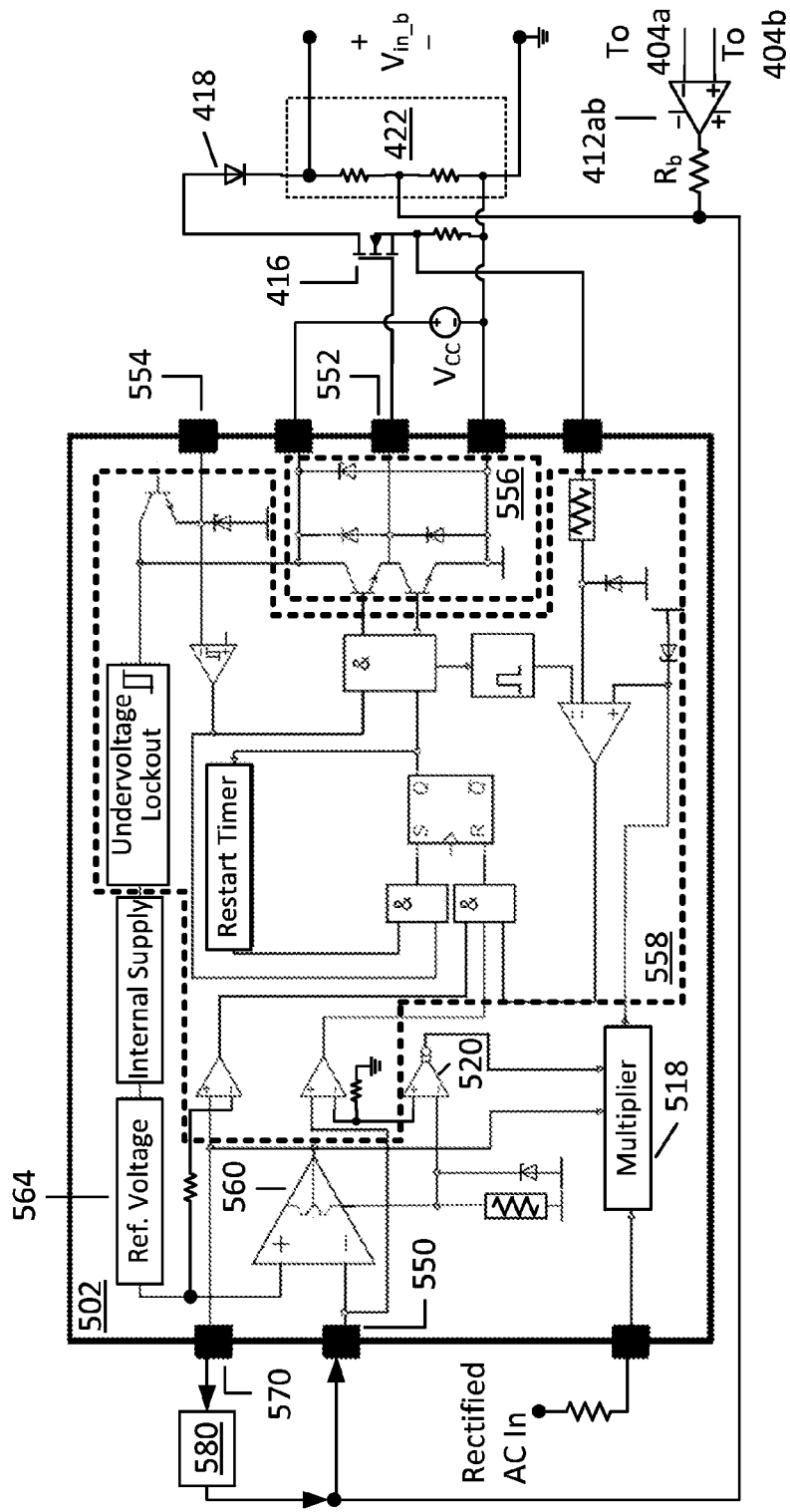
FIG. 5 is a block diagram illustrating a PFC regulator circuit in accordance with example embodiments described herein.

FIG. 5 shows an embodiment of a PFC regulator 502 that may be used as the PFC regulator 414 of FIGS. 4A-4C. In particular, FIG. 5 illustrates an exemplary use of PFC regulator 502 in the slave PFC stage 402b of FIGS. 4A-4B. In other embodiments, the PFC regulator 502 may be used in a bridgeless PFC topology.

Referring again to FIG. 5, PFC regulator 502 includes a voltage sense pin 550 that inputs the voltage level at the center tap of voltage divider 422 that is connected across the voltage $V_{in\_b}$.

The sensed voltage from voltage sense pin 550 is provided as an inverting input to control amplifier 560, which also has a non-inverting input that is connected to a reference voltage supply 564. Voltage sense pin 550 also receives feedback from a compensation network 580 that is connected to the output of the control amplifier 570. The compensation network may be, for example, a passive network of resistors, capacitors, etc., or it may be a network that contains amplifiers such as, for example, a Proportional Integral (PI) controller. The output of control amplifier 560 is also provided to an comparator 520 that provides overvoltage monitoring of the output of the control amplifier 560. The output of the comparator 520 is provided to a multiplier 518 that also receives the output of the control amplifier 560 and is also connected through a resistor network to rectified AC input power. The output of the multiplier and the output of the control amplifier are also provided to a monitoring/protection stage 558.

The monitoring/protection stage 558 may include one or more comparators providing output over-voltage protection, and/or output under-voltage protection. The monitoring/ protection stage 558 may also include a turn-off flip-flop 561 that prevents multiple pulses during the switching procedure of the PFC switch 416. Other components of the monitoring/ protection stage 558 may include, for example, one or more restart/start-up timers, reference oscillators, logic gates, transistors, diodes, etc. The monitoring/protection stage 558 provides a pair of logic signal outputs that each control a respective gate of a pair of transistors of a driver output stage 556 that are connected in series across a supply voltage potential $V_{CC}$. A center tap between the pair of transistors of the driver output stage 556 provides a drive output signal at a drive output pin 552 of the PFC regulator 502. This drive output signal drives the gate of PFC switch 416 based on the sensed voltage at the voltage sense pin 550.

Figure 6:
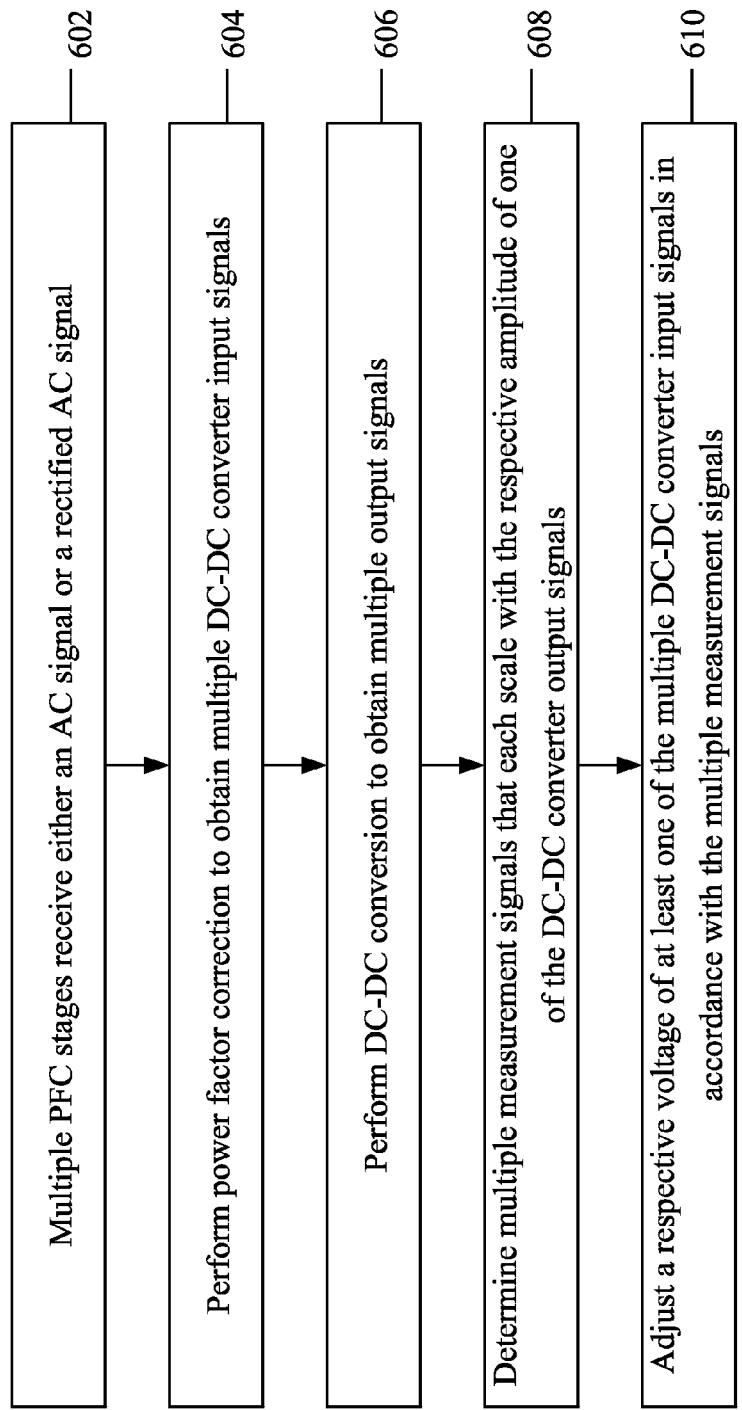
FIG. 6 is a flow diagram illustrating a method for power conversion in accordance with example embodiments described herein.

FIG. 6 is a flow diagram that shows an embodiment method for power conversion. At step 602, multiple PFC stages receive a power signal that is either an AC signal or a rectified AC signal. At step 604, these PFC stages perform power factor correction on the power signal to obtain multiple DC-DC converter input signals. At step 606, multiple parallel DC-DC converter stages perform DC-DC conversion on multiple DC-DC converter input signals to obtain multiple output signals. At step 608, multiple measurement signals are determined, and each of these measurement signals scales in accordance with the respective amplitude of one of the DC-DC converter output signals. At step 610, a respective voltage of at least one of the multiple DC-DC converter input signals is adjusted in accordance with the multiple measurement signals.

Illustrative embodiments of the present invention have the advantage of minimizing the size and cost of an output capacitor for filtering the ripple component of AC-DC converter output current. An embodiment system may use, for example, feedback from a DC-DC converter stage to a slave PFC stage to reduce a difference in output current ripple amplitude between parallel DC-DC converter stages. An embodiment system may also use, for example, shunt resistors located in a resonant tank of an LLC converter may be used to sense current to the converter for increased measurement accuracy. In other example embodiments, the sensor elements may be located outside the resonant tank to reduce power dissipated by resonant tank current flowing through the shunt resistor.

The following additional example embodiments of the present invention are also provided. In accordance with a first example embodiment of the present invention, there is provided a method for power conversion, including performing, by a plurality of parallel stages, DC-DC conversion on a plurality of input signals to obtain a plurality of output signals each having a respective amplitude. The method also includes determining a plurality of measurement signals that each scale in accordance with the respective amplitude of one of the plurality of output signals, and adjusting, in accordance with the plurality of measurement signals, a respective voltage of at least one of the plurality of input signals.

Also, the foregoing first example embodiment may be implemented to include one or more of the following additional features. The method may be implemented to further include receiving, by a plurality of power factor correction stages, a power signal including one of an alternating current signal and a rectified signal, and performing power factor correction on the power signal to obtain the plurality of input signals. The method may also be implemented where a first output signal in the plurality of output signals includes a current ripple amplitude that scales in accordance with a first input signal in the plurality of input signals, a second output signal in the plurality of output signals includes a current ripple amplitude that scales in accordance with a second input signal in the plurality of input signals, and the adjusting the respective voltage of at least one of the plurality of input signals includes: determining, in accordance with a first measurement signal and a second measurement signal, a control signal that scales in accordance with a difference between the current ripple amplitude of the first output signal and the current ripple amplitude of the second output signal; and adjusting a voltage of the second input signal in accordance with the control signal. The method may also be implemented where the adjusting the voltage of the second input signal includes one of: increasing the voltage of the second input signal when the current ripple amplitude of the second output signal is less than the current ripple amplitude of the first output signal; and decreasing the voltage of the second input signal when the current ripple amplitude of the second output signal is greater than the current ripple amplitude of the first output signal. The method may also be implemented where the plurality of power factor correction stages includes a master stage configured to output the first input signal and a slave stage configured to output the second input signal, and the adjusting the voltage of the second input signal includes one of adjusting a switching frequency of the slave stage and adjusting a duty cycle of the slave stage. The method may also be implemented where each of the plurality of output signals further includes a different signal phase. The method may also be implemented where the plurality of parallel stages includes an LLC converter, the LLC converter includes a resonant tank, and the resonant tank includes a resonance capacitor.

The foregoing method may also be implemented where the resonant tank further includes a shunt resistor, and the method further includes determining a measurement signal of the plurality of measurement signals in accordance with a voltage across the shunt resistor. The method may also be implemented where the LLC converter further includes a parallel branch circuit coupled in parallel with the resonant tank, the parallel branch circuit includes a shunt resistor and a shunt capacitor coupled in series with the shunt resistor, and the method further includes determining a measurement signal of the plurality of measurement signals in accordance with a voltage across the shunt resistor.

In accordance with a second example embodiment of the present invention, there is provided a power circuit, that includes a plurality of parallel stages configured to perform DC-DC conversion on a plurality of input signals to obtain a plurality of output signals each having a respective amplitude, and to determine a plurality of measurement signals each in accordance with the respective amplitude of one of the plurality of output signals. The power circuit is also configured to adjust, in accordance with the plurality of measurement signals, a respective input voltage of at least one of the plurality of input signals.

Also, the foregoing second example embodiment may be implemented to include one or more of the following additional features. The power circuit may further include a plurality of power factor correction stages configured to receive a power signal including one of an alternating current signal and a rectified signal, and to perform power factor correction on the power signal to obtain the plurality of input signals. The power circuit may also be implemented such that a first output signal in the plurality of output signals includes a current ripple amplitude that scales in accordance with a first input signal in the plurality of input signals, such that a second output signal in the plurality of output signals includes a current ripple amplitude that scales in accordance with a second input signal in the plurality of input signals, and such that the power circuit is further configured to determine, in accordance with a first measurement signal and a second measurement signal, a control signal that scales in accordance with a difference between the current ripple amplitude of the first output signal and the current ripple amplitude of the second output signal, and to adjust a voltage of the second input signal in accordance with the control signal. The power circuit may also be further configured to increase a voltage of the second input signal when the current ripple amplitude of the second output signal is less than the current ripple amplitude of the first output signal, and to decrease a voltage of the second input signal when the current ripple amplitude of the second output signal is greater than the current ripple amplitude of the first output signal. The power circuit may also be implemented such that the plurality of power factor correction stages includes both a master stage configured to output the first input signal and a slave stage configured to output the second input signal, and such that the power circuit is further configured to adjust the voltage of the second input signal by performing one of adjusting a switching frequency of the slave stage and adjusting a duty cycle of the slave stage. The power circuit where each of the plurality of output signals further includes a different signal phase. The power circuit may also be implemented such that the plurality of parallel stages includes an LLC converter, the LLC converter includes a resonant tank, and the resonant tank includes a resonance capacitor.

The foregoing power circuit may also be implemented such that the resonant tank further includes a shunt resistor, and the power circuit is further configured to determine a measurement signal of the plurality of measurement signals in accordance with a voltage across the shunt resistor. The power circuit may also be implemented such that the LLC converter further includes a parallel branch circuit coupled in parallel with the resonant tank, the parallel branch circuit includes the shunt resistor and a shunt capacitor coupled in series with the shunt resistor, and the power circuit is further configured to determine a measurement signal of the plurality of measurement signals in accordance with a voltage across the shunt resistor.

In accordance with a third example embodiment of the present invention, there is provided a power system that includes a first DC-DC converter circuit and a second DC-DC converter circuit, each including a power input terminal and a sensor. The sensor includes a sensor output terminal and at least one of a current sensor and a voltage sensor. The power system also includes a master Power Factor Correction (PFC) circuit that includes a power output terminal coupled to the power input terminal of the first DC-DC converter circuit; and a slave PFC circuit, which includes a power output terminal coupled to the power input terminal of the second DC-DC converter circuit and a voltage adjustment terminal coupled to the sensor output terminal of the second DC-DC converter circuit and to the sensor output terminal of the first DC-DC converter circuit.

Also, the foregoing third example embodiment may be implemented to include one or more of the following additional features. The power system may be implemented to further include a comparator circuit that includes: a first input terminal coupled to the sensor output terminal of the first DC-DC converter circuit; a second input terminal coupled to the sensor output terminal of the second DC-DC converter circuit; and an output terminal coupled to the voltage adjustment terminal of the slave PFC circuit. The power system may also be implemented where the slave PFC circuit further includes: a PFC switch coupled to the power output terminal of the slave PFC circuit; and a PFC switch control circuit that includes an input terminal coupled to the voltage adjustment terminal, one of a switching frequency adjustment circuit and a duty cycle adjustment circuit, and an output terminal coupled to an input terminal of the PFC switch. The power system may also be implemented to further include: an output filter capacitor; a plurality of parallel DC-DC converter circuits, which includes the first DC-DC converter circuit, the second DC-DC converter circuit, and an output coupled to the output filter capacitor; a rectifier; and a plurality of parallel PFC circuits, including the master PFC circuit, the slave PFC circuit, and an input coupled to an output of the rectifier.

The foregoing power system may also be implemented to further include a converter switch control circuit, such that each of the plurality of parallel DC-DC converter circuits further includes a switch bank, and the switch bank includes an input terminal coupled to an output terminal of the converter switch control circuit. The power system may also be implemented where the plurality of parallel DC-DC converter circuits includes an LLC converter, the LLC converter includes a resonant tank, and the resonant tank includes a resonance capacitor.

The foregoing power system may also be implemented such that a sensor input terminal of the LLC converter is magnetically coupled to a power output terminal of the LLC converter, and a sensor output terminal of the LLC converter is configured to provide a signal that scales in accordance with a current ripple amplitude of a signal provided by the power output terminal of the LLC converter. The power system may also be implemented such that the resonant tank further includes a sensor of the LLC converter; and the sensor of the LLC converter includes a shunt resistor. The power system may also be implemented such that the LLC converter further includes a parallel branch circuit coupled in parallel with the resonant tank, the parallel branch circuit includes a sensor of the LLC converter, and the sensor of the LLC converter includes a shunt resistor and a shunt capacitor coupled in series with the shunt resistor.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for power conversion, comprising:
    performing, by a plurality of parallel stages, DC-DC conversion on a plurality of input signals to obtain a plurality of output signals each having a respective amplitude;
    determining a plurality of measurement signals that each scale in accordance with the respective amplitude of one of the plurality of output signals, wherein determining the plurality of measurement signals comprises measuring a current ripple amplitude of each of the plurality of output signals; and
    adjusting, in accordance with the plurality of measurement signals, a respective voltage of at least one of the plurality of input signals.

2. The method of claim 1, further comprising:
    receiving, by a plurality of power factor correction stages, a power signal comprising one of an alternating current signal and a rectified signal; and
    performing power factor correction on the power signal to obtain the plurality of input signals.

3. The method of claim 2, wherein
    a first output signal in the plurality of output signals comprises a first current ripple amplitude that scales in accordance with a first input signal in the plurality of input signals,
    a second output signal in the plurality of output signals comprises a second current ripple amplitude that scales in accordance with a second input signal in the plurality of input signals, and
    the adjusting the respective voltage of at least one of the plurality of input signals comprises:
        determining, in accordance with a first measurement signal and a second measurement signal, a control signal that scales in accordance with a difference between the first current ripple amplitude of the first output signal and the second current ripple amplitude of the second output signal; and
        adjusting a voltage of the second input signal in accordance with the control signal.

4. The method of claim 3, wherein the adjusting the voltage of the second input signal comprises one of:
    increasing the voltage of the second input signal when the second current ripple amplitude of the second output signal is less than the first current ripple amplitude of the first output signal; and
    decreasing the voltage of the second input signal when the second current ripple amplitude of the second output signal is greater than the first current ripple amplitude of the first output signal.

5. The method of claim 4, wherein:
    the plurality of power factor correction stages comprises a master stage configured to output the first input signal, and a slave stage configured to output the second input signal; and
    the adjusting the voltage of the second input signal comprises one of:
        adjusting a switching frequency of the slave stage; and
        adjusting a duty cycle of the slave stage.

6. The method of claim 1, wherein each of the plurality of output signals further comprises a different signal phase.

7. The method of claim 1, wherein
    the plurality of parallel stages comprises an LLC converter,
    the LLC converter comprises a resonant tank, and
    the resonant tank comprises a resonance capacitor.

8. The method of claim 7, wherein
    the resonant tank further comprises a shunt resistor, and
    the method further comprises determining a measurement signal of the plurality of measurement signals in accordance with a voltage across the shunt resistor.

9. The method of claim 7, wherein
    the LLC converter further comprises a parallel branch circuit coupled in parallel with the resonant tank,
    the parallel branch circuit comprises a shunt resistor and a shunt capacitor coupled in series with the shunt resistor, and
    the method further comprises determining a measurement signal of the plurality of measurement signals in accordance with a voltage across the shunt resistor.

10. A power circuit, comprising:
    a plurality of parallel stages configured to:
        perform DC-DC conversion on a plurality of input signals to obtain a plurality of output signals each having a respective amplitude; and
        determine a plurality of measurement signals each in accordance with the respective amplitude of one of the plurality of output signals by measuring a current ripple amplitude of each of the plurality of output signals; and wherein the power circuit is configured to adjust, in accordance with the plurality of measurement signals, a respective input voltage of at least one of the plurality of input signals.

11. The power circuit of claim 10, further comprising:
a plurality of power factor correction stages configured to:
receive a power signal comprising one of an alternating current signal and a rectified signal; and
perform power factor correction on the power signal to obtain the plurality of input signals.

12. The power circuit of claim 11, wherein
a first output signal in the plurality of output signals comprises a current ripple amplitude that scales in accordance with a first input signal in the plurality of input signals;
a second output signal in the plurality of output signals comprises a current ripple amplitude that scales in accordance with a second input signal in the plurality of input signals; and
the power circuit is further configured to:
determine, in accordance with a first measurement signal and a second measurement signal, a control signal that scales in accordance with a difference between the current ripple amplitude of the first output signal and the current ripple amplitude of the second output signal; and
adjust a voltage of the second input signal in accordance with the control signal.

13. The power circuit of claim 12, further configured to:
increase a voltage of the second input signal when the current ripple amplitude of the second output signal is less than the current ripple amplitude of the first output signal; and
decrease a voltage of the second input signal when the current ripple amplitude of the second output signal is greater than the current ripple amplitude of the first output signal.

14. The power circuit of claim 13, wherein:
the plurality of power factor correction stages comprises a master stage configured to output the first input signal, and a slave stage configured to output the second input signal; and
the power circuit is further configured to adjust the voltage of the second input signal by performing one of:
adjusting a switching frequency of the slave stage; and
adjusting a duty cycle of the slave stage.

15. The power circuit of claim 10, wherein each of the plurality of output signals further comprises a different signal phase.

16. The power circuit of claim 10, wherein
the plurality of parallel stages comprises an LLC converter,
the LLC converter comprises a resonant tank, and
the resonant tank comprises a resonance capacitor.

17. A power circuit, comprising:
a plurality of parallel stages configured to:
perform DC-DC conversion on a plurality of input signals to obtain a plurality of output signals each having a respective amplitude; and
determine a plurality of measurement signals each in accordance with the respective amplitude of one of the plurality of output signals, wherein the power circuit is configured to adjust, in accordance with the plurality of measurement signals, a respective input voltage of at least one of the plurality of input signals, wherein
the plurality of parallel stages comprises an LLC converter,
the LLC converter comprises a resonant tank,
the resonant tank comprises a resonance capacitor
the resonant tank further comprises a shunt resistor, and
the power circuit is further configured to determine a measurement signal of the plurality of measurement signals in accordance with a voltage across the shunt resistor.

18. The power circuit of claim 17, wherein
the LLC converter further comprises a parallel branch circuit coupled in parallel with the resonant tank; and
the parallel branch circuit comprises the shunt resistor and a shunt capacitor coupled in series with the shunt resistor.

19. A power system, comprising:
a first DC-DC converter circuit and a second DC-DC converter circuit, each comprising:
a power input terminal;
a DC-DC converter power output terminal;
a sensor comprising a sensor output terminal and at least one of a current sensor and a voltage sensor, the sensor output terminal configured to provide a signal that scales in accordance with a current ripple amplitude of a signal provided by the DC-DC converter power output terminal; and
a master power factor correction (PFC) circuit comprising a master PFC power output terminal coupled to the power input terminal of the first DC-DC converter circuit; and
a slave PFC circuit, comprising:
a slave power output terminal coupled to the power input terminal of the second DC-DC converter circuit; and
a voltage adjustment terminal coupled to the sensor output terminal of the second DC-DC converter circuit and to the sensor output terminal of the first DC-DC converter circuit.

20. The power system of claim 19, wherein the slave PFC circuit further comprises:
a PFC switch coupled to the slave power output terminal of the slave PFC circuit; and
a PFC switch control circuit comprising:
an input terminal coupled to the voltage adjustment terminal;
one of a switching frequency adjustment circuit, and a duty cycle adjustment circuit; and
an output terminal coupled to an input terminal of the PFC switch.

21. The power system of claim 19, further comprising:
an output filter capacitor;
a plurality of parallel DC-DC converter circuits, comprising:
the first DC-DC converter circuit;
the second DC-DC converter circuit; and
an output coupled to the output filter capacitor;
a rectifier; and
a plurality of parallel PFC circuits, comprising:
the master PFC circuit;
the slave PFC circuit; and
an input coupled to an output of the rectifier.

22. The power system of claim 21, further comprising:
a converter switch control circuit, wherein
- each of the plurality of parallel DC-DC converter circuits further comprises a switch bank, and
- the switch bank comprises an input terminal coupled to an output terminal of the converter switch control circuit.

23. The power system of claim 21, wherein
the plurality of parallel DC-DC converter circuits comprises an LLC converter,
the LLC converter comprises a resonant tank, and
the resonant tank comprises a resonance capacitor.

24. The power system of claim 23, wherein
a sensor input terminal of the LLC converter is magnetically coupled to the DC-DC converter power output terminal.

25. The power system of claim 24, wherein
the resonant tank further comprises a sensor of the LLC converter; and
the sensor of the LLC converter comprises a shunt resistor.

26. The power system of claim 24, wherein
the LLC converter further comprises a parallel branch circuit coupled in parallel with the resonant tank,
the parallel branch circuit comprises a sensor of the LLC converter, and
the sensor of the LLC converter comprises a shunt resistor and a shunt capacitor coupled in series with the shunt resistor.

27. A power system, comprising:
a first DC-DC converter circuit and a second DC-DC converter circuit, each comprising:
- a power input terminal; and
- a sensor comprising a sensor output terminal and at least one of a current sensor and a voltage sensor; and a master power factor correction (PFC) circuit comprising
- a power output terminal coupled to the power input terminal of the first DC-DC converter circuit;

a slave PFC circuit, comprising:
- a power output terminal coupled to the power input terminal of the second DC-DC converter circuit; and
- a voltage adjustment terminal coupled to the sensor output terminal of the second DC-DC converter circuit and to the sensor output terminal of the first DC-DC converter circuit; and a comparator circuit comprising:
- a first input terminal coupled to the sensor output terminal of the first DC-DC converter circuit;
- a second input terminal coupled to the sensor output terminal of the second DC-DC converter circuit; and
- an output terminal coupled to the voltage adjustment terminal of the slave PFC circuit.

* * * * *